United States Patent [19]
Kime et al.

[11] 3,798,991
[45] Mar. 26, 1974

[54] INTERMEDIATE RIGHT ANGLE SPEED REDUCER

[75] Inventors: Donald L. Kime, Dayton; Ronald G. Stogdill, Trotwood, both of Ohio

[73] Assignee: Chemineer, Inc., Dayton, Ohio

[22] Filed: Dec. 18, 1972

[21] Appl. No.: 315,922

[52] U.S. Cl. .................................. 74/417
[51] Int. Cl. ............................... F16h 1/20
[58] Field of Search .................. 74/417, 423

[56] References Cited
UNITED STATES PATENTS

| | | | |
|---|---|---|---|
| 1,106,149 | 8/1914 | Loomis | 74/417 X |
| 2,223,779 | 12/1940 | Bloss | 74/417 |
| 2,276,561 | 3/1942 | Bloss | 74/417 X |
| 2,600,555 | 6/1952 | Maier | 74/417 |

*Primary Examiner*—Leonard H. Gerin
*Attorney, Agent, or Firm*—Biebel, French & Bugg

[57] ABSTRACT

A right angle speed reducer incorporates speed change gears in a first speed reduction stage, a third speed reduction stage for driving the output shaft, intermediate right angle spiral bevel reduction gearing interconnecting the first and third reduction stages, all tapered roller bearings, splash lubrication of all high speed bearings, and a dry well output for the lower output shaft bearing.

9 Claims, 6 Drawing Figures

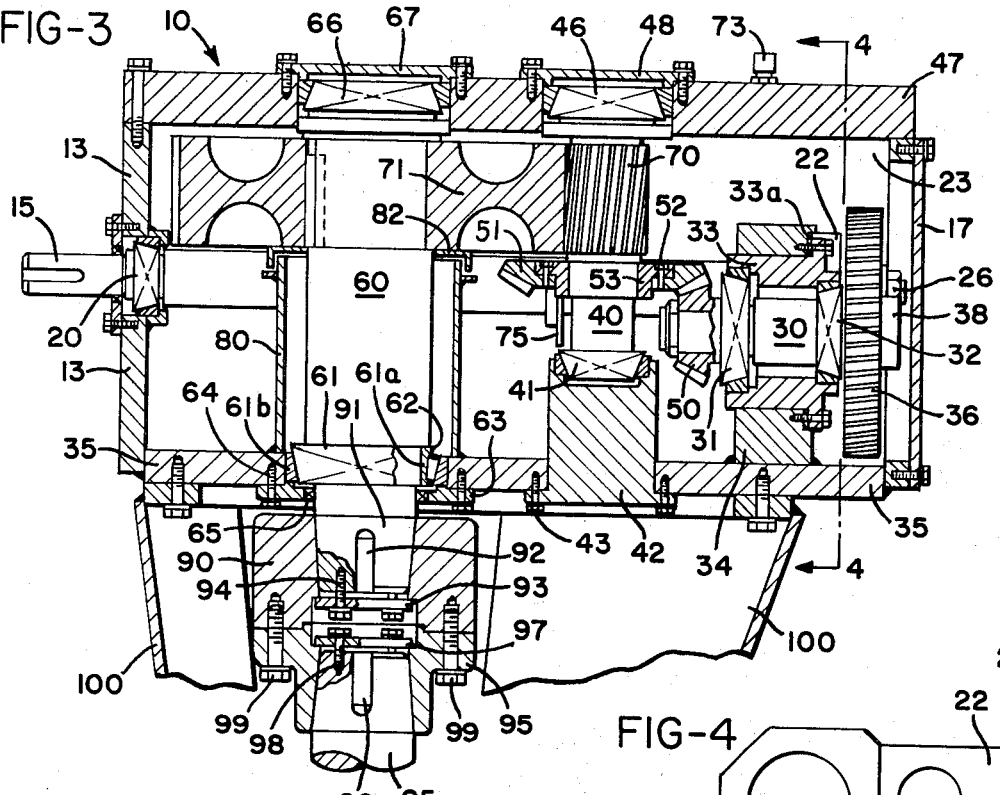
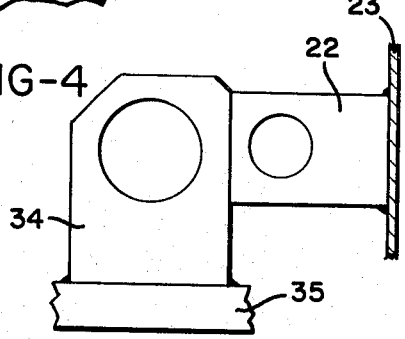
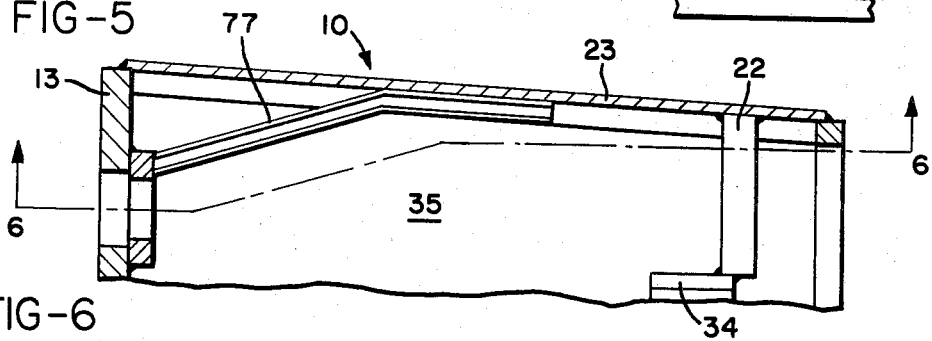
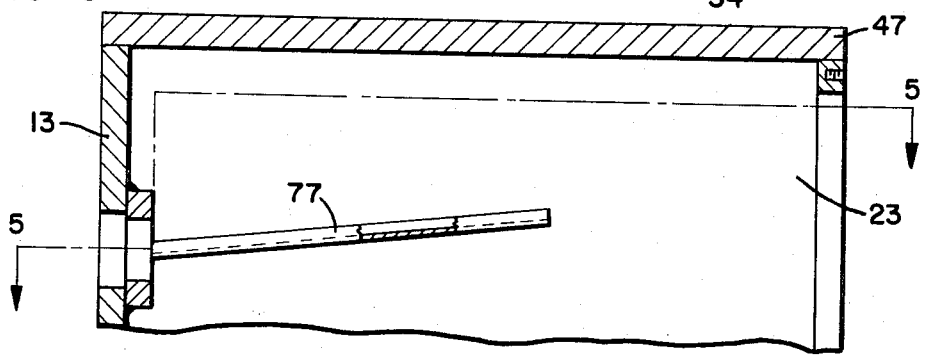

INTERMEDIATE RIGHT ANGLE SPEED REDUCER

CROSS REFERENCE TO RELATED APPLICATIONS

Reference is made to our copending application Ser. No. 315,921 filed on even date herewith, and assigned to the assignee of the present invention.

BACKGROUND OF THE INVENTION

This invention relates to right angle drives, and more particularly to high torque right angle speed reducers for driving agitators such as mixers and the like.

High torque right angle speed reducers have found wide application as agitator drives where a horizontally disposed prime mover must drive a vertically disposed agitator shaft. Such right angle speed reducers are used in sizes ranging from 1 to 1,000 horsepower, handle torques from 15,000 to $10^6$ inch pounds, deliver output speeds from 1 to 500 rpm, and so on. Since the agitator itself is frequently completely unsupported within the chamber in which the agitation and mixing take place, the right angle speed reducer must serve as the sole support for the agitator. The already enormous stresses and demands placed on such right angle speed reducers are thus even further increased, especially where extremely viscous materials are encountered.

Because of these tremendous demands, prior art devices have usually been bulky, noisy, relatively complicated, and limited in both durability and serviceability. Various advantageous features have been included from time to time in some of these devices, including change gears to enable the right angle drive to provide a variety of output speeds for a given input shaft speed, splash lubrication for some of the shaft bearings, and so on. Triple and other multiple stages of speed reduction have also been employed, particularly in the larger sizes, due to the tremendous forces, the large gear sizes, and the great amount of speed reduction required. In addition to the problems just mentioned, large size, multiple stage, right angle speed reducers generate high noise levels and usually suffer wear and power losses in the stage which converts the motion from horizontal to vertical. A need thus still remains for a large size multi-stage right angle speed reducer which has long life and durability, operates efficiently, and generates a low noise level.

SUMMARY OF THE INVENTION

Briefly, this invention provides a multi-stage right angle speed reducer having exceptional compactness, durability, serviceability, and quietness of operation, wherein spiral bevel gearing is employed at an intermediate stage to effect the transition from horizontal to vertical rotational movement. The spiral bevel gearing is a highly efficient and relatively low noise type of right angle gearing. By using an intermediate right angle stage, this invention eliminates high right angle gear surface speeds which would otherwise occur in the first stage, and eliminates the need for exceptionally large, strong, and expensive right angle gearing which would be necessary if used in the final stage. The intermediate right angle spiral bevel gearing stage thus provides relatively compact, inexpensive, quiet, durable, and efficient operation.

A prime mover is attached to a horizontally disposed input shaft which passes through the housing of the speed reducer substantially to the end opposite the end to which the prime mover is attached. A pair of change gears is located behind a removable access plate at the end of the housing opposite the prime mover. The change gears form part of the first speed reduction stage and drivably interconnect the input shaft with the intermediate spiral bevel gears. The location of the change gears behind the readily removable access plate provides convenient accessibility for changing the reduction ratio of the speed reducer to suit the particular task at hand.

This invention further incorporates tapered roller bearings throughout, for increased service life and quiet operation, as well as to enable each shaft to carry greater loads. A splash lubrication system for all high speed bearings assures adequate lubrication for every such bearing, while the low speed bearings, such as those on the output shaft, are separately lubricated with a heavy lubricant. A dry well output protects the contents of the mixing container from contamination by the oil used for the splash lubrication system.

The particular design of this invention not only provides exceptional strength and durability, but is also highly compact and requires exceptionally low head room. For example, the top of the drive extends virtually no higher than the prime mover itself, making this design particularly attractive for crowded applications.

It is therefore an object of this invention to provide a multi-stage right angle speed reducer for driving an agitator from a horizontally disposed prime mover; a right angle speed reducer incorporating an intermediate right angle speed reduction stage; a reducer wherein the intermediate right angle speed reduction stage includes spiral bevel gearing; a right angle speed reducer having readily accessible change gears; having splash lubrication for all relatively high speed shaft bearings; a dry well output for the lower output shaft bearing; all tapered roller bearing shaft bearings; and to accomplish all of the above objects and purposes in a configuration having high strength, low cost, compact size, great flexibility in application, exceptionally long life and durability, quiet operation and being adapted to a wide range of environments and conditions.

Other objects and advantages of the invention will be apparent from the following description, the accompanying drawings and the appended claims.

BRIEF DESCRIPTION OF THE DRAWINGS

FIG. 3 is a partial view in vertical section generally in the plane of the output shaft of the reducer of FIG. 2;

FIG. 4 is a fragmentary view taken generally on line 4—4 of FIG. 3;

FIG. 5 is a partial cross-sectional top view taken on line 5—5 of FIG. 6, with portions of the speed reducer omitted for clarity, showing the splash lubrication viaduct for the input shaft bearing adjacent the prime mover; and FIG. 6 is a partial section similar to FIG. 5 and taken on line 6—6 thereof, showing the viaduct of FIG. 5.

DESCRIPTION OF THE PREFERRED EMBODIMENT

Figures 1, 2:
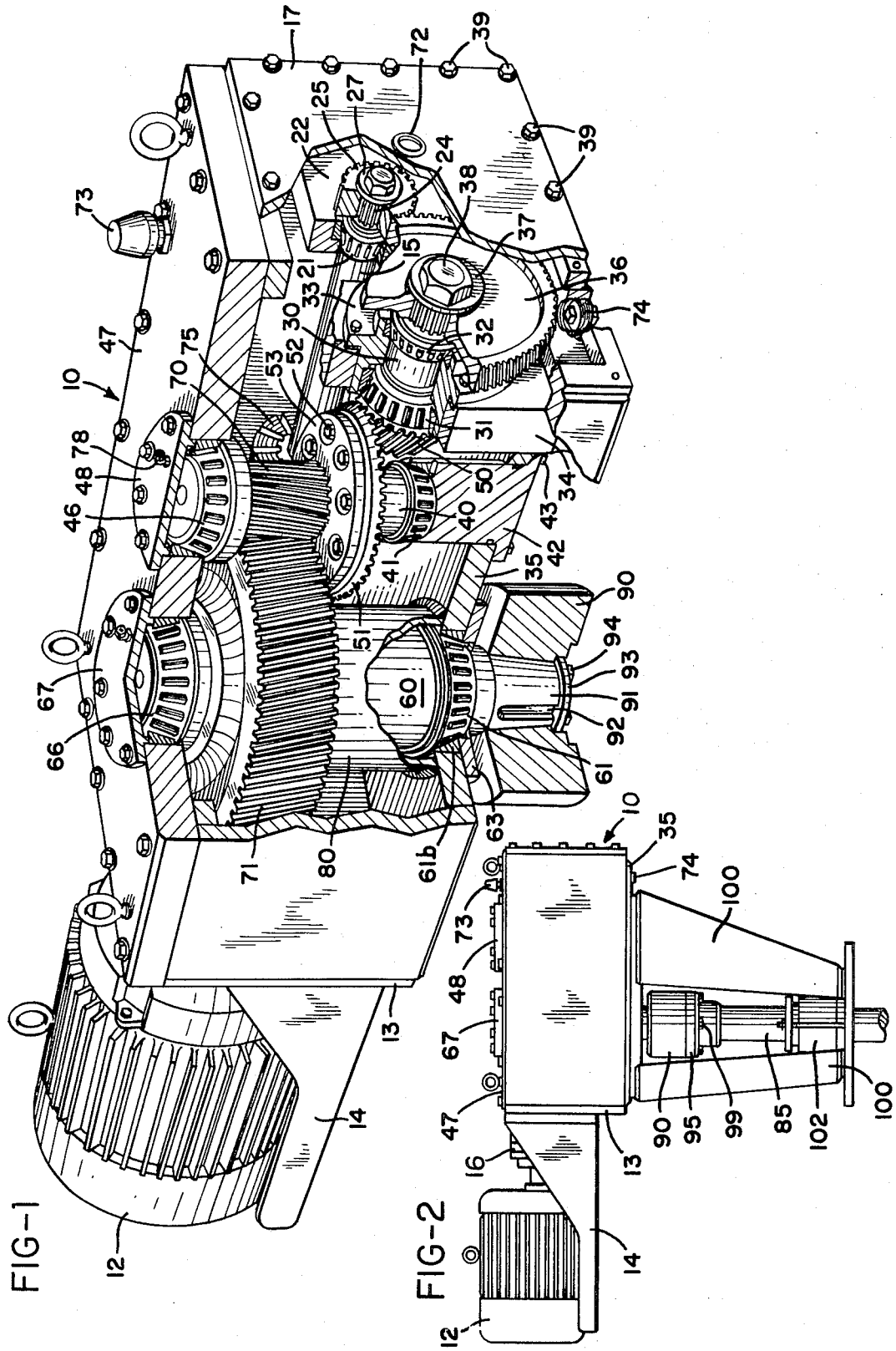
FIG. 1 is a partially broken-away perspective view of a triple reduction right angle speed reducer according to this invention, and showing the intermediate right angle spiral bevel gearing incorporated therein.
FIG. 2 is a side view of the speed reducer of FIG. 1 on a mounting stand and coupled to an agitator shaft.

With reference to the drawings, and more particularly to FIG. 1, the three-stage right angle speed reducer includes a box-like housing 10 having a prime mover 12, such as an electric motor, conveniently mounted on the housing side wall 13 on a mounting bracket 14.

A flexible coupling 16 connects prime mover 12 in driving relationship to an input shaft 15, which passes through side wall 13 and extends entirely across the housing 10 almost to the opposite side wall 17. Input shaft 15 is mounted within housing 10 on a first tapered roller bearing 20 supported in side wall 13 and a second tapered roller bearing 21 supported in an internal bearing support wall 22 projecting from the side wall 23 of the housing. The end of the input shaft 15 adjacent wall 17 is splined at 24 slightly beyond bearing 21 for receiving a first change gear 25, which is held thereon by a nut 26 and washer 27 threaded on the outer end of shaft 15. The splined configuration enables the use of very small change gears 25, smaller than would be practical, for example, with a key and slot configuration.

A first intermediate shaft 30 is mounted within housing 10 on tapered roller bearings 31 and 32 supported in a cartridge 33 extending through a boss 34 which extends upwardly from the bottom wall 35 of the housing 10 near input shaft 15. Shims 33a between cartridge 33 and boss 34 enable the cartridge to be positioned very precisely in boss 34, for reasons further set forth below. The end of first intermediate shaft 30 adjacent wall 17 extends beyond bearing 32 and is splined to receive a second change gear 36 which is held thereon by a washer 37 and a bolt 38 threaded into shaft 30.

The first and second change gears 25 and 36 are of complementary sizes according to the spacing of shaft 30 from shaft 15, in order to mesh in the desired driving relationship. Wall 17 is attached to housing 10 by means of bolts 39 and may be removed easily when it is desired to replace the change gears 25 and 36 with another set of complementary change gears having a different reduction ratio. By this means, the particular reduction ratio provided by this invention is easily and conveniently changed, simply by removing wall 17 and changing the change gears 25 and 36 accordingly. The long input shaft 15, which locates the first change gear 25 near wall 17 facilitates the ease with which the change gears may be changed since the prime mover 12, side wall 13, input shaft 15 and first intermediate shaft 30 are able to remain intact at all times. Virtually no disassembly of the reducer is required whenever a reduction ratio change is made.

A second intermediate shaft 40 is rotatably mounted within housing 10 by a lower tapered roller bearing 41 supported on a bearing boss member 42 extending through and secured by bolts 43 to the bottom wall 35 of the housing. The upper end of shaft 40 is supported in a tapered roller bearing 46 retained in a bore in the top wall 47 of the housing which has a removable cap 48. Shaft 40 and bearings 41 and 46 are oriented to place the axis of rotation of shaft 40 substantially at right angles to those of shafts 15 and 30.

An intermediate right angle spiral bevel reduction gearing assembly comprising a driving pinion gear 50 and a driven ring gear 51 forms the driving connection between the first intermediate shaft 30 and the second intermediate shaft 40. Driving gear 50 is attached to the end of shaft 30 opposite gear 36 and intermeshes with driven gear 51 which is attached by means of bolts 52 to a driving ring 53 welded to the second intermediate shaft 40. Since proper meshing of gears 50 and 51 is very important, cartridge 33 and shims 33a mount shaft 30 as a single, easily adjustable sub-assembly. Gear 50 is then easily and precisely positionable with respect to gear 51. The intermediate right angle spiral bevel gearing 50–51 is a highly efficient type of gearing which simultaneously provides a stage of speed reduction, effects a right angle change in the drive, and provides very quiet operation. The quietness of operation of the intermediate right angle spiral bevel gearing 50–51 is enhanced by the location of this assembly following the first stage of speed reduction provided by change gears 25 and 36. The surface speed of the right angle gearing 50–51 is thus considerably reduced, resulting in far less noise.

The output shaft 60 is firmly supported on the bottom wall 35 of housing 10 by a tapered roller bearing 61 having its inner race 61a proportioned to form a seat for the annular shoulder 62 on shaft 60. The outer race 61b is in turn supported on a plate 63 secured by bolts 64 to bottom wall 35 and also retaining a shaft seal 65. The upper end of shaft 60 is supported at substantially right angles to input shaft 15 by a tapered roller bearing 66 retained in the cap 67 of the housing which closes the access opening in top wall 47.

Speed reduction gears 70 and 71 are drivably attached to the second intermediate shaft 40 and the output shaft 60, respectively, to form the final speed reduction stage therebetween. As can be seen in FIG. 1, speed reduction gears 70 and 71 are of substantial size due to the great forces which result from the three stages of speed reduction. A principle advantage of this invention thus resides in the use of the right angle spiral bevel gearing at the second or intermediate stage, and before the final stage, since the intermediate spiral bevel gears 50 and 51 thus need not be nearly as large as are gears 70 and 71. The spiral bevel gears 50 and 51 are therefore much less expensive than they would be were they used in the final stage.

The input shaft tapered roller bearings 20 and 21 and the first intermediate shaft tapered roller bearings 31 and 32 are relatively high speed bearings and are therefore lubricated with an oil-type lubricant. This invention therefore incorporates a splash lubrication system which maintains the proper lubrication on these relatively high speed bearings. The splash lubrication is provided by maintaining a level of lubricating oil within housing 10 to a depth of approximately one-third of the interior depth of the reducer. Oil check window 72 is provided in wall 17 for ease in checking and maintaining the proper oil level. The oil may be added through an oil filler and breather cap 73 and removed through a magnetic oil drain plug 74.

With such a level of oil maintained within housing 10, the high speed movement of the various gears, such as the change gears 25 and 36, will splash the oil throughout the interior of the reducer, adequately lubricating the bearings near these gears. As can be noted from the drawings, however, input shaft bearing 20 is removed some distance from these gears, and the splash lubrication system of this invention therefore includes an oil flinging fan 75 attached to input shaft 15, and an oil trough or viaduct 77 (FIGS. 5 and 6) extending and sloping from the vicinity of fan 75 to the input shaft tapered roller bearing 20. Fan 75 extends partially into the oil within housing 10 and splashes additional lubricating oil toward trough 77 and the large speed reduction gears 70 and 71. Trough 77 collects a portion of the lubricating oil thrown by fan 75 and conveys it to bearing 20 to assure proper splash lubrication of all the high speed bearings and gears.

The intermediate spiral bevel gears 50-51 also effect a stage of speed reduction, thus causing the second intermediate shaft 40 to rotate at a speed considerably slower than that of the input and first intermediate shafts 15 and 30. Tapered roller bearings 41 and 46 are thus intermediate speed bearings and may be lubricated either by the splash lubrication system of this invention or else separately lubricated with heavy lubricants. Since the second intermediate shaft lower bearing 41 is below the level of the oil within housing 10, it is lubricated by the oil of the splash lubrication system. The second intermediate shaft upper tapered roller bearing 46, however, is isolated from the splash lubrication system and is separately lubricated with a heavy grease-type lubricant. This grease-type lubricant may be applied, for example, through a fitting such as fitting 78 on bearing cap 48.

Similarly, the output shaft tapered roller bearings 61 and 66 are relatively low speed bearings and are lubricated separately with a heavy grease-type lubricant.

Since the right angle speed reducer is mounted above the container in which the mixing and agitation take place, the output shaft is provided with a dry well output to protect the contents of the container from the lighter lubrication of the splash lubrication system. The dry well output comprises a cylindrical wall 80 which extends from the bottom 35 of housing 10 up and underneath the speed reduction gear 71. Wall 80 thus extends considerably above the level of the oil contained within housing 10, while the top of the dry well is protected from the splash lubrication system by a well cover rim 82 attached to gear 71. Cover 82 extends fully across and down around the upper edge of wall 80 to prevent the splash lubricant from entering the dry well and reaching the lower output shaft bearing and seal.

FIGS. 1-3 illustrate the means by which output shaft 60 is coupled to an agitator shaft 85. An upper coupling half 90 having a tapered bore is attached over the tapered end 91 of output shaft 60. Coupling half 90 is interlocked in driving relation with end 91 by a conventional key (not shown) and slot 92, and is retained thereon by a retaining washer 93 and bolts 94.

A lower coupling half 95 is similarly attached to the agitator shaft 85 by a key (not shown) and slot 96, washer 97, and bolts 98. The lower coupling half 95 is then attached to the upper coupling half 90 by means of coupling bolts 99 which pass through half 95 and are threaded into upper coupling half 90.

The speed reducer of this invention may be mounted in any desired fashion to support and drive the agitator shaft as desired. One common mounting system employs a mounting stand such as stand 100 in FIG. 5, the bottom of which may be attached directly to the mixing chamber into which shaft 85 then passes. A seal 102, such as a conventional stuffing box seal, is usually provided.

As may be seen, therefore, this invention has numerous advantages. The use of the intermediate right angle spiral bevel speed reduction gear set provides for exceptional compactness, efficiency, durability, quietness, and economy. The spiral bevel gear set itself is a high efficiency type of gearing, and its use following a first stage of speed reduction (provided by the change gears) reduces the surface speed of the spiral bevel gear set, thus substantially reducing the noise generated thereby.

On the other hand, the spiral bevel gear set is not employed in the final speed reduction stage, but is located intermediate the first and last stages of speed reduction. Thus the forces to which the spiral bevel gear set is subjected are less than those it would receive in the final stage. This means that the right angle gears need not be nearly as large, and hence not nearly as expensive, as if they were employed in the final stage. And, as will be readily appreciated by those skilled in the art, other right angle speed reducer means may also be used beneficially at this intermediate stage, to reduce the noise generated thereby while causing only a fraction of the increase in size and cost that would occur at the final stage. Spiral bevel gearing is preferred, however, due to its high efficiency and low noise characteristics.

The use throughout of all tapered roller bearings provides for exceptionally long life and durability, greater load capacity, and contributes even further to the quiet operation of this invention. The high load, relatively low speed tapered roller bearings on the output shaft enable this invention to drive an agitator shaft, such as shaft 85, without the need for special output shaft supports extending above the main body of the speed reducer.

The ease with which change gears 25 and 36 may be changed, by removing wall 17, nut 26, and bolt 38, provides a substantial increase in the utility of this invention over many prior art designs. An absolute minimum of disassembly is required, and the use of spline gear attachment means for attaching the change gears to the input and first intermediate shafts provides additional operational range capabilities, as well as convenience in changing these gears.

The splash lubrication system provides exceptionally efficient, effective, and uncomplicated lubrication throughout the speed reducer, and the dry well output makes the splash lubrication system fully compatible with the use of mixing containers therebeneath.

The overall design is straightforward and uses a minimum of parts, making it readily applicable to a wide range of size, power, and speed requirements. There is essentially no penalty attached in scaling this invention upwardly or downwardly, and in exceedingly large sizes additional speed reduction stages may be provided before and/or after the intermediate right angle speed reduction stage.

While the form of apparatus herein described constitutes a preferred embodiment of this invention, it is to be understood that the invention is not limited to this precise form of apparatus, and that changes may be made therein without departing from the scope of the invention.

What is claimed is:

1. A right angle speed reducer for driving an agitator from a power source, comprising:
   a. a housing,
   b. an input shaft mounted in said housing,
   c. a first speed reducer means in said housing drivably connected to said input shaft,
   d. an output shaft mounted in said housing on an axis of rotation substantially at right angles to that of said input shaft,
   e. a third speed reducer means in said housing drivably connected to said output shaft, and
   f. an intermediate right angle speed reducer means in said housing intermediate and drivably interconnecting said first and said third speed reducer means, said first speed reducer means reducing the speed and generated noise of said intermediate right angle speed reducer means.

2. The speed reducer of claim 1 wherein said intermediate right angle speed reducer means comprises spiral bevel gearing for highly efficient, low noise operation.

3. The speed reducer of claim 1 wherein said first speed reducer means further comprises:
   a. a first intermediate shaft, and
   b. change gear means drivably connecting said input shaft to said first intermediate shaft.

4. The speed reducer of claim 3 further comprising adjustable cartridge means mounting said first intermediate shaft in said speed reducer for precise adjustment and positioning therein.

5. The speed reducer of claim 1 wherein said third speed reducer means further comprises:
   a. a second intermediate shaft having an axis of rotation substantially parallel to that of said output shaft, and
   b. speed reduction gear means drivably connecting said second intermediate shaft to said output shaft.

6. The speed reducer of claim 1 further comprising:
   a. relatively low speed bearing means rotatably mounting said output shaft in said housing,
   b. relatively high speed bearing means rotatably mounting at least one of the remaining shafts in said housing, and
   c. splash lubrication means within said housing for lubricating said relatively high speed bearing means.

7. The speed reducer of claim 6 wherein all said shaft bearing means comprise tapered roller bearings.

8. The speed reducer of claim 6 further comprising a dry well output means for protecting the contents of a mixing container located therebeneath.

9. A right angle speed reducer for driving an agitator from a power source, comprising:
   a. a housing,
   b. an input shaft,
   c. relatively high speed tapered roller bearings rotatably mounting said input shaft in said housing,
   d. means on one end of said input shaft for drivably attaching said input shaft to a prime mover,
   e. means on the other end of said input shaft for drivably receiving a first change gear thereon,
   f. a first intermediate shaft,
   g. a cartridge,
   h. relatively high speed tapered roller bearings rotatably mounting said first intermediate shaft in said cartridge,
   i. means adjustably mounting said cartridge and first intermediate shaft in said housing near said input shaft,
   j. shim means in said adjustable cartridge mounting means for precise adjustment and positioning thereof in said housing,
   k. means on said first intermediate shaft for drivably receiving a second change gear thereon in driven speed reducing relationship with a first change gear on said input shaft,
   l. a second intermediate shaft rotatably mounted in said housing with the axis of rotation thereof substantially at right angles to that of said input shaft,
   m. intermediate right angle spiral bevel gearing speed reducer means intermediate and drivably interconnecting said first and said second intermediate shafts for high efficiency, low noise operation, said speed change gears reducing the speed and generated noise of said right angle speed reducer means,
   n. an output shaft,
   o. relatively low speed tapered roller bearing means rotatably mounting said output shaft in said housing near said second intermediate shaft, with the axis of rotation thereof substantially at right angles to that of said input shaft and substantially parallel to that of said second intermediate shaft,
   p. speed reduction gear means drivably connecting said second intermediate shaft to said output shaft,
   q. splash lubrication means within said housing for lubricating at least said relatively high speed bearing means, and
   r. dry well output means for protecting the contents of a mixing container located therebeneath.

* * * * *

Disclaimer 3,798,991.—*Donald L. Kime*, Dayton, and *Ronald G. Stogdill*, Trotwood, Ohio. INTERMEDIATE RIGHT ANGLE SPEED REDUCER. Patent dated Mar. 26, 1974. Disclaimer filed Jan. 29, 1976, by the assignee, *Chemineer, Inc.*

Hereby enters this disclaimer to claims 1, 2, 5, 6 and 8 of said patent.

[*Official Gazette March 23, 1976.*]